United States Patent

Toide

[11] Patent Number: 5,148,320
[45] Date of Patent: Sep. 15, 1992

[54] PROJECTION LENS
[75] Inventor: Eiichi Toide, Nagaokakyo, Japan
[73] Assignee: Mitsubishi Denki Kabushiki Kaisha, Tokyo, Japan
[21] Appl. No.: 689,507
[22] Filed: Apr. 23, 1991
[30] Foreign Application Priority Data
  Apr. 23, 1990 [JP] Japan ................................. 2-107927
  Dec. 27, 1990 [JP] Japan ................................. 2-417490
[51] Int. Cl.$^5$ ........................ G02B 9/62; G02B 13/18
[52] U.S. Cl. ................................. 359/649; 359/713; 359/757
[58] Field of Search ............... 350/432, 412; 359/649, 359/713, 757

[56] References Cited
U.S. PATENT DOCUMENTS

| 4,300,817 | 11/1981 | Betensky | 359/651 |
| 4,348,081 | 9/1982 | Betensky | 359/650 |
| 4,989,961 | 2/1991 | Yoshioka | 359/713 |

FOREIGN PATENT DOCUMENTS
1269911 10/1989 Japan ................................. 350/432

Primary Examiner—Bruce Y. Arnold
Assistant Examiner—David R. Parsons

[57] ABSTRACT

A projection lens system is for projecting an enlargement, on a display screen, of an image appearing on a faceplate of a cathode ray tube. The system includes six groups. The first group from the screen end is in the form of a positive meniscus. The second group includes a weak positive lens element having a surface convex to the screen. The third group includes a negative lens element. The fourth group includes a bi-convex lens element. The fifth group includes a weak positive element. The sixth group has a negative index of refraction. Each of the second and fifth groups include a plastic lens element that has at least one aspheric surface.

33 Claims, 7 Drawing Sheets

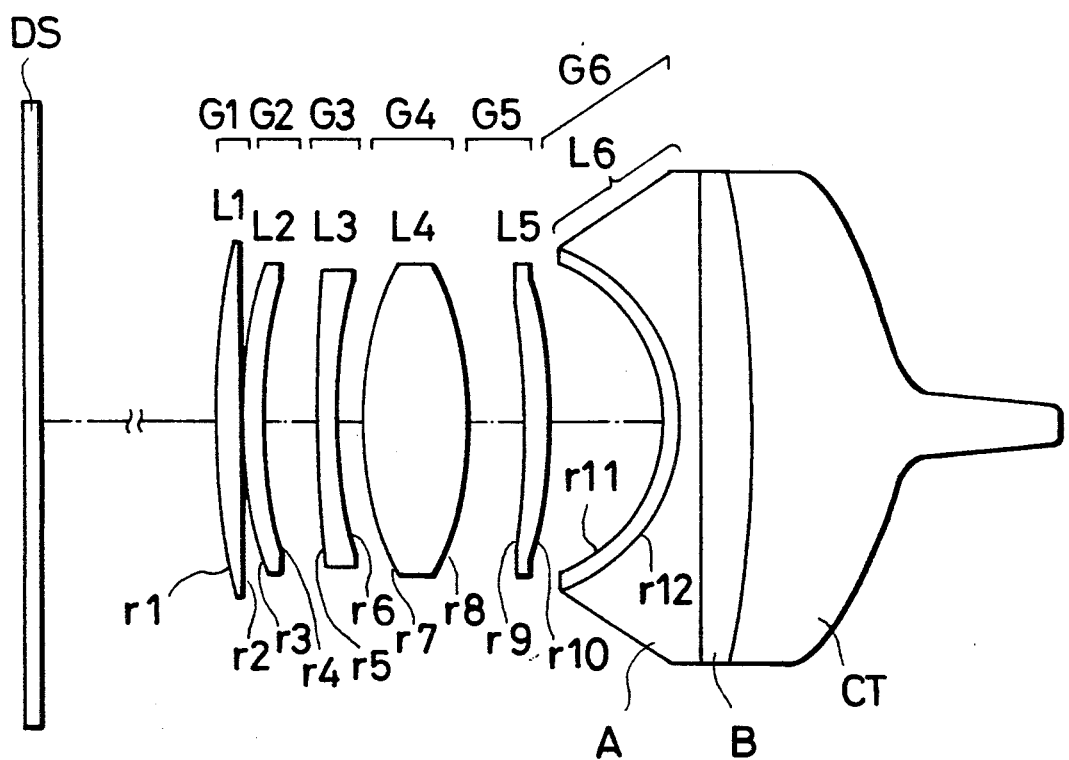

SPHERICAL ABERRATION

ASTIGMATISM

SPHERICAL ABERRATION

F 1.12

[mm]

ASTIGMATISM

ω35°C

[mm]

RELATIVE IMAGE HEIGHT

PROJECTION LENS

FIELD OF THE INVENTION

The present invention relates to projection lenses and more particularly relates to lenses for use in a projection display which projects an enlargement of an image appearing on a cathode ray tube (CRT).

BACKGROUND OF THE INVENTION

In recent years, projection television is spreading as a means for producing a television image on a large screen. In attaining the quality of the image, the performance of the projection lens plays an important role.

The projection lens for a projection television needs to have a substantial nominal focal ratio (with an F-number close to 1) to secure the "brightness" of the lens, and, in addition, must be capable of good correction of aberration to the periphery of the screen. A problem associated with the projection television is its depth, which is larger than that of the direct-viewing television (ordinary television set with the CRT fluorescent surface seen directly), so a projection lens with a shorter projection length is desired.

To achieve a high image-forming performance, a large nominal focal ratio and a large field angle with a conventional projection lens formed solely of glass lens elements, the number of lens elements, and the aperture must be increased, and the cost is therefore increased. Moreover, the weight of the entire lens system is increased. Furthermore, correction of the performance in the periphery of the screen is difficult. If aspheric plastic lens elements are employed, correction of the aberration to the periphery is facilitated. However, if the aspherical amount is increased to increase the corrective power, the precision in the fabrication is lowered, and the design performance is not fully realized. In particular, when the aspheric lens is provided near the screen, because of the large light beam diameter, the precision error easily cause aberration. Thus, due to the occurrence of the flare, the contrast is lowered. In addition, the refractive index and the shape of the plastic lens vary to a greater extent. Thus, due to occurrence of the defocus, image-forming performance is degraded.

SUMMARY OF THE INVENTION

An object of the invention is provide a projection lens which is compact and has a smaller depth.

Another object of the invention is to provide a good focusing performance throughout the entire screen area of the projection television.

A further object of the invention is to provide a projection lens which is easy to fabricate, and has a good temperature characteristics.

A further object of the invention is to provide a projection lens which has a wide field angle and employs an aspheric plastic lens element.

A projection lens according to the invention comprises six groups, the first group from the screen end being in the form of a positive meniscus, the second group being positive and convex to the screen, the third group being negative, the fourth group being bi-convex, the fifth group being positive, and the sixth group having a negative power of refraction surface, each of the second and fifth groups comprising a plastic lens element having at least one aspheric surface.

The first group and the second group have the functions of precise correction of spherical aberration and coma, and have a weak positive converging function. The third group has the functions of weak divergence and correcting the spherical aberration and the off-axis aberration, and balancing with other groups, particularly, the first and second groups. The fourth group has the functions of the correction of the spherical aberration and the coma that are left uncorrected by the first to the third groups, and the function of strong light convergence. The fifth group has the function of precise correction of the astigmatism, distortion and the coma. The sixth group comprises a lens element having a surface concave to the screen, serves as the field flattener, and has the function of the correction of curvature of field and spherical aberration. The function of the correction of curvature is required for correct image formation on a CRT fluorescent surface which is concave to the screen.

In order to fully provide the above corrective functions, each of the second and the fifth groups comprises an aspheric lens element. By forming the aspheric lens element from a plastic material, the fabrication cost is substantially reduced.

In a first aspect of the invention, the following conditions should preferably be satisfied.

$$0.15 < f/f_1 < 0.35 \tag{1}$$

$$-0.45 < f/f_3 < -0.30 \tag{2}$$

$$1.00 < f/f_4 < 1.15 \tag{3}$$

$$-0.90 < f/f_6 < -0.85 \tag{4}$$

where
f represents the focal length of the overall system,
$f_1$ represents the focal length of the first group,
$f_3$ represents the focal length of the third group,
$f_4$ represents the focal length of the fourth group, and
$f_6$ represents the focal length of the sixth group.

The above condition (1) relates to the power of the first group. If the upper limit is exceeded, correction of the off-axis aberration, particularly the coma, is difficult. If the lower limit is exceeded, correction of the spherical aberration is difficult. This will necessitate increase of power of the second group formed of a plastic lens element. Since the temperature coefficient of the refractive index of the plastic material is large, defocus may occur in the event of temperature variation.

The above condition (2) relates to the power of the third group, and is required to keep balance of the spherical aberration with the first and the second groups.

The above condition (3) relates to the power of the fourth group. When the upper limit is exceeded, correction of the sagittal flare is difficult. When the lower limit is exceeded, the coma occurs easily.

When the upper limit of the above condition (4) is exceeded, the correction of the curvature of field is insufficient (under correction). When its lower limit is exceeded the correction is excessive (over correction).

In a second aspect of the invention, the fourth group comprises a first lens element and a second lens element. The first lens element is a positive bi-convex lens element. The second lens element is disposed close to the first lens element.

Since the fourth group, which performs convergence, comprises two lens elements, the off-axis aberration can be restrained to the minimum, and the aspherical amount of the lens element of the fifth group can be made small.

In the second aspect, it is preferable that the following conditions be satisfied:

$$0.0 < f/f_1 < 0.3 \quad (5)$$

$$-0.4 < f/f_3 < -0.1 \quad (6)$$

$$0.2 < f/f_{4b} < 0.6 \quad (7)$$

where
f represents the focal length of the entire system,
$f_1$ represents the focal length of the first group,
$f_3$ represents the focal length of the third group, and
$f_{4b}$ represents the focal length of the second lens element of the fourth group.

The above condition (5) relates to the power of the first group. When the specified range is exceeded, the correction, particularly the correction of the spherical aberration is difficult. This will require increase of the aspherical amount of the second group, and the resultant manufacturing tolerance is not practical.

The above condition (6) relates to the power of the third group. When the specified range is exceeded, the balancing in the spherical aberration with the the first and the second groups is difficult.

The above condition (7) relates to the power of the the second lens element of the fourth group. When the lower limit is exceeded, the power of the first lens element of the fourth group has to be enhanced, which will in turn make it difficult to correct the coma. When the upper limit is exceeded it is difficult to secure the light quantity at the periphery.

BRIEF DESCRIPTION OF THE DRAWINGS

FIG. 1 shows the configuration of a projection lens of a first embodiment of the invention.

DETAILED DESCRIPTION OF THE PREFERRED EMBODIMENTS

Figure 2A:
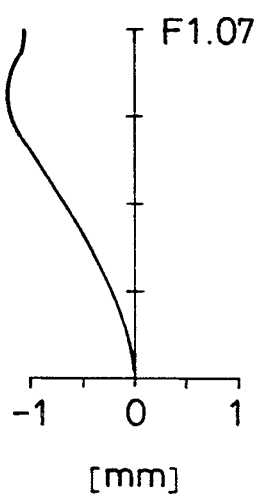
FIGS. 2a and 2b show the abberration of the first embodiment.

Embodiments of the invention will now be described with reference to the drawings.

Embodiments A1 and A2

Embodiment A1

FIG. 1 shows a configuration of the projection lens of an embodiment of a first aspect of the invention. The projection lens is for projecting an enlargement, on a display screen DS, of an image appearing on a faceplate B of a cathode ray tube CT. The projection lens of this embodiment comprises six groups G1 to G6. The groups G1 to G6 are called the first to sixth groups, respectively, in order as seen from the screen DS.

The first group G1 from the screen end comprises a lens element L1 which is in the form of a meniscus having a positive power of refraction surface. It has the function of correcting, mainly, the spherical aberration and the coma.

The second group G2 comprises a lens element L2 which is a plastic aspheric lens. It is in the form of a meniscus convex to the display screen DS. It has only a little power, and precisely corrects the spherical aberration throughout the aperture.

The lens element L2 of the second group G2 does not have an inflection point on either surface. Light beam of a large diameter passes through the lens element L2 of the second group G2, but as both of the surfaces of this lens do not have the inflection point, it is easy to fabricate the shape exactly identical to the designed shape, so spherical aberration due to fabrication error is very small.

The third group G3 comprises a lens element L3 which is in the form of a meniscus, and has a weak negative power of refraction surface. Like the first and the second group lens elements L1 and L3, the third group lens element L3 has the function of correcting the coma and the spherical aberration.

The fourth group G4 comprises a lens element L4 which has a strong convergence function.

The fifth group G5 comprises a lens element L5 which is a plastic aspheric lens and has only a little power and precisely corrects the astigmatism and the distortion. The lens element L5 of the fifth group G5 has a surface concave to the screen. It is disposed at a position where the marginal ray height from the optical axis is small, so that it gives only a little effect to the spherical aberration, and can effectively correct off-axis aberration up to the periphery of the screen.

The sixth group G6 comprises a lens element L6 which has a strong concave surface to the screen. Together with the cooling liquid A, it serves as a negative lens, and mainly corrects the field curvature.

The CRT faceplate B has a spherical fluorescent surface.

The lens elements L2 and L5 of the second and the fifth groups G2 and G5 are made of plastics and are aspheric on both sides, but their aspherical amount can be restrained to a small value. They are therefore easy to fabricate, and the designed performance can be realized with a high accuracy. Since they have only a little power, the tolerance in the disposition (positioning) can be made large, and the defocus due to temperature variation is not problematical in practice.

The fluorescent surface is spherical and concave to the screen DS. More light at the periphery of the screen can therefore be transferred to the lens. As a result, the peripheral light quantity ratio of not less than 40% is achieved over 90% of the relative maximum field angle.

Figure 2B:
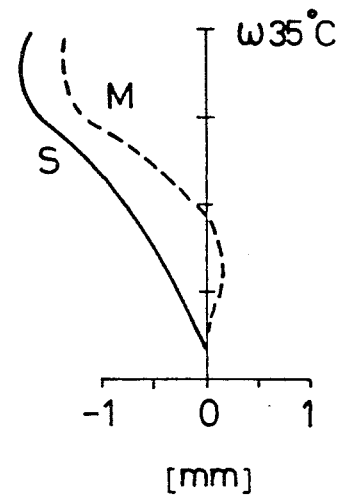
Figure 3:
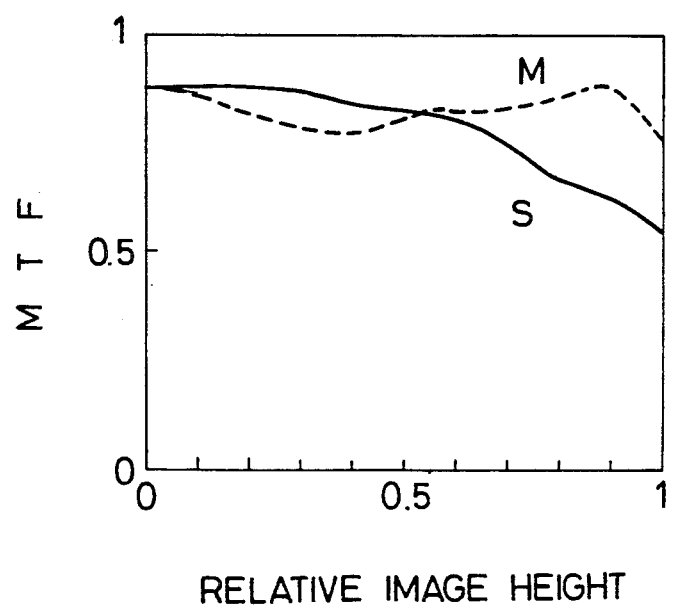
FIG. 3 shows the MTF (modulation transfer function) characteristics of the first embodiment.

Various aberrations in the first embodiment, A1, of the invention is shown in FIG. 2, and MTF (modulation transfer function) with the spatial frequency of 400 TV-lines (2.5 line-pair/mm) is depicted in FIG. 3 to show that a good focusing performance is obtained to the periphery. (The 2.5 line-pair/mm means a density of 2.5 pairs of black and white alternate stripes (or 5 such stripes) per millimeter.) The parameters of the lens in the first embodiment, A1, are shown in Table A1.

Embodiment A2

Figure 4:
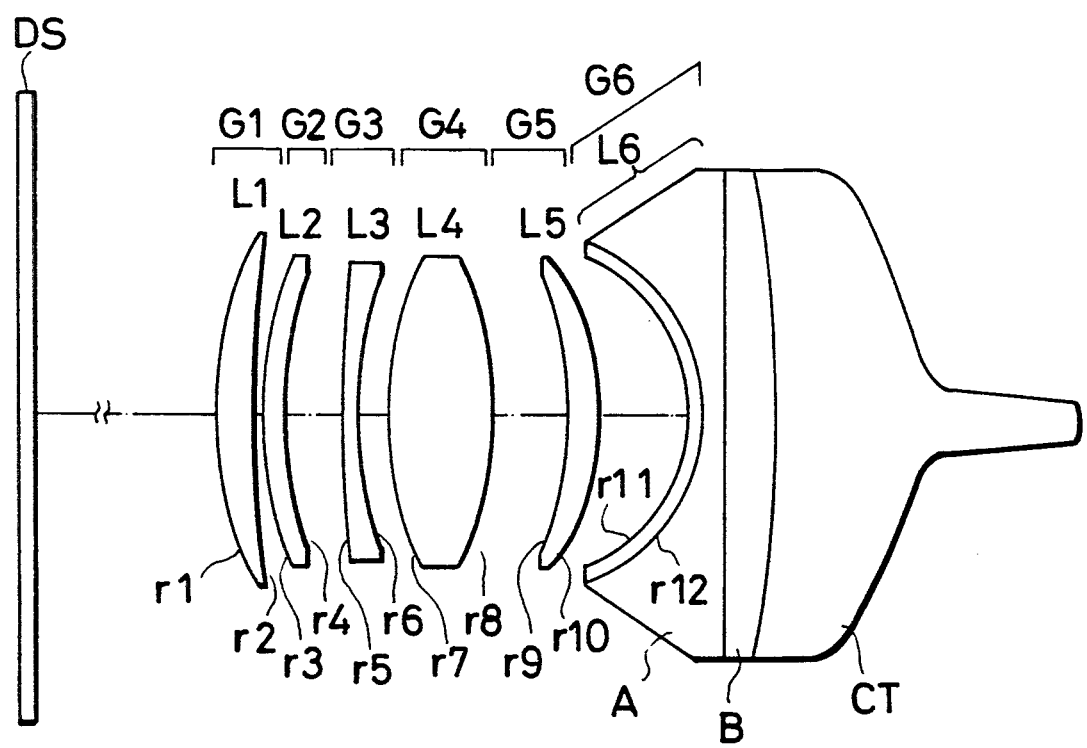
FIG. 4 shows the configuration of a projection lens of a second embodiment of the invention.
Figure 5A:
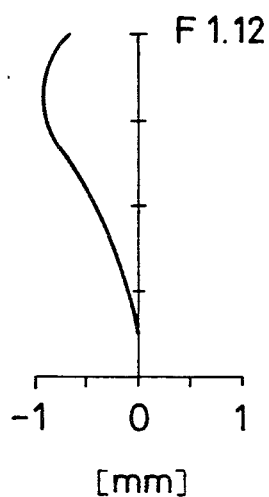
FIGS. 5a and 5b the aberration of the second embodiment.
Figure 5B:
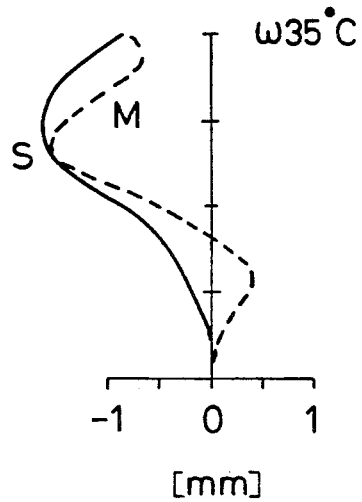
Figure 6:
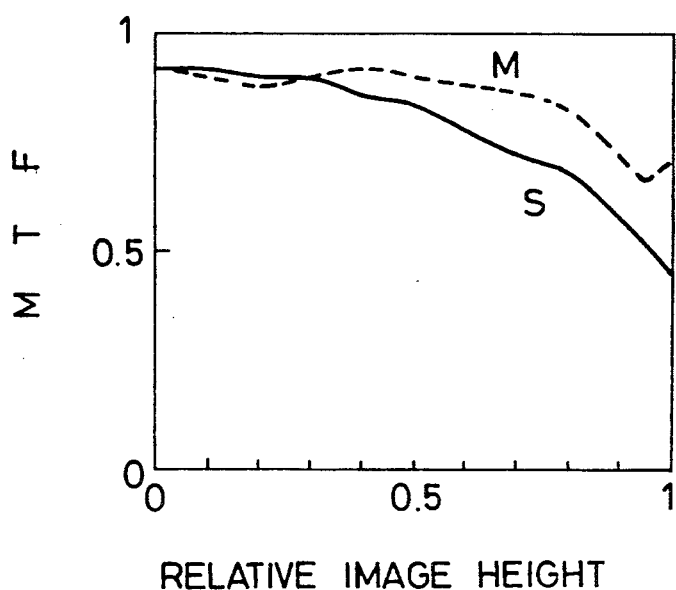
FIG. 6 shows the MTF characteristics of the second embodiment.

A second embodiment of the invention has a configuration shown in FIG. 4. Parameters of the lens in this second embodiment A2 are shown in Table A2, the various aberrations are shown in FIG. 5 and the MTF is shown in FIG. 6.

In Table A1 and A2, r1, r2, . . . denote the radius of the surface of each lens element, the cooling liquid, the faceplate or the fluorescent surface, numbered from the side of the screen, d1, d2, . . . denote the thickness of the lens element at the center and the spacing between the lens elements, n1, n2, . . . denote the refractive index ($\lambda = 543$ nm), and $\nu 1$, $\nu 2$, . . . denote Abbe's invariant, The aspheric surface of the lens elements L2 and L5 is a surface of revolution which is described by the following relationship. In other words, the aspheric surface is a set (assembly) of points which satisfy the following relationship, in which x denotes a sag, i.e., a distance (of the given point), in the direction of the optical axis, from a flat plane normal to the optical axis and containing the vertex of aspheric surface. Further, p denotes the distance of the given point from the optical axis.

$$x = \frac{p^2/R}{1 + \{1 - (1 + CC)\,p^2/R^2\}^{\frac{1}{2}}} + \qquad (8)$$

$$A_4 p^4 + A_6 p^6 + A_8 p^8 + A_{10} p^{10}$$

where
  R denotes the radius (ri ($i = 1, 2, \ldots$)) of curvature of the surface which is a constant for each surface,
  CC denotes the aspheric coefficient, and
  $A_4$, $A_6$, $A_8$, and $A_{10}$ denote the high-order coefficients.

The first and the second embodiments A1 and A2 both satisfy the conditions (1) to (4) set forth above.

According to the first aspect of the invention described above, a good focusing performance is obtained throughout the entire screen area, and MTF of not less than 80% can be achieved with a spatial frequency of 400 TV lines, and a wide field angle of not less than 35 degrees can be achieved, so the size of the projection television can be reduced. Moreover, without using an expensive glass material having a refractive index of 1.7 or more, plastic lens elements are effectively used. Thus, the cost of the projection lens is lowered.

EMBODIMENTS B1 to B4

Figure 7:
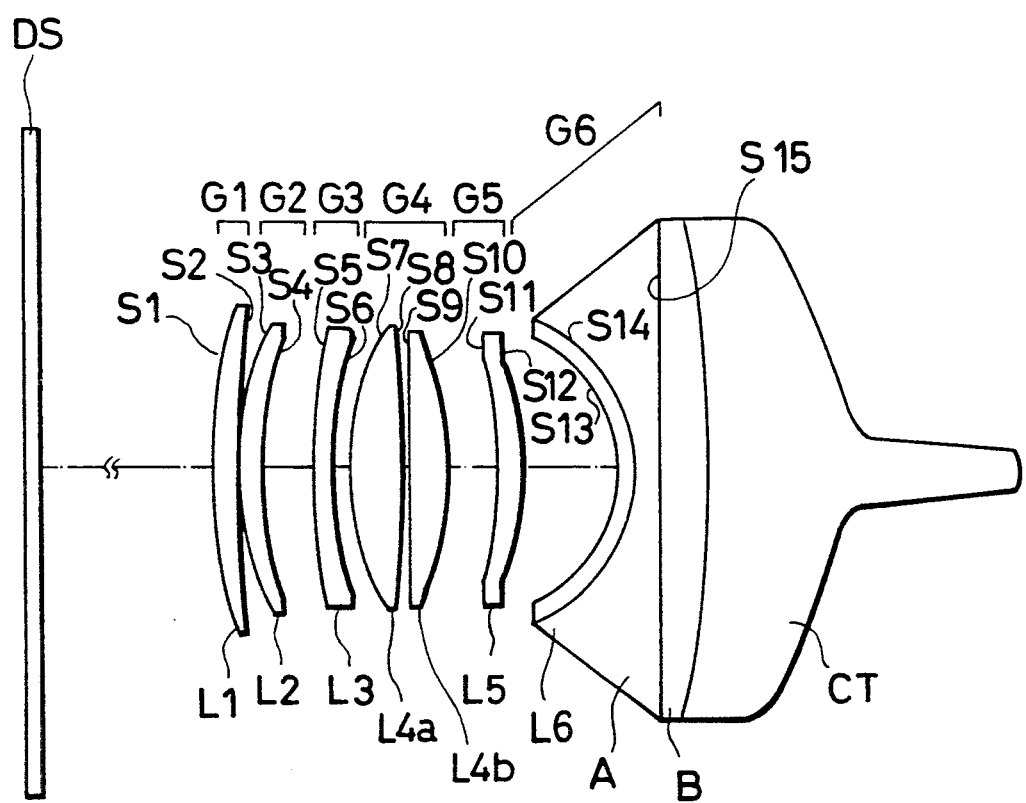
FIG. 7 shows the configuration of the projection lens of embodiments of a second aspect of the invention.

Embodiments of a second aspect of the invention have a configuration shown in FIG. 7. It is similar to the configuration of FIG. 1 and FIG. 4, but the fourth group G4 comprises a first lens element L4a and a second lens element L4b. The first lens element L4a of the fourth group G4 is a positive bi-convex lens. The second lens element L4b of the fourth group G4 is disposed close to the first lens element L4a.

Since the fourth group G4 which performs the convergence comprises the two lens elements L4a and L4b, the off-axis aberration can be suppressed to the minimum, and the aspherical amount of the lens element L5 of the fifth group G5 can be made small.

Tables B1 to B4 shows the parameters of embodiments of the second aspect of the invention. In the tables B1 to B4:
  $s_i$ denotes the i-th surface (in order as seen from the screen) of the lens element or the like,
  R denotes the radius of curvature of the surface which is a constant for each surface,
  D denotes the thickness or spacing between the surfaces,
  N denotes the refractive index, and
  $\nu$ denotes the Abbe's invariant.

The aspheric shape of the surface of the lens elements L2 and L5 of the second and the fifth groups G2 and G5 is described also by the relationship (8), previously indicated.

Embodiment B1

Figures 8A, 8B:
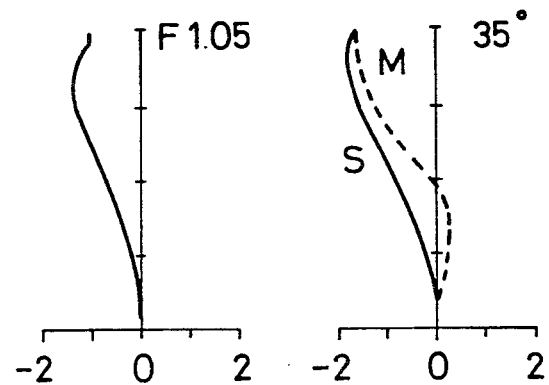
FIGS. 8a and 8b the aberration of a third embodiment, B1, of the invention.

The dimensions, coefficients and other numerical factors of Embodiment B1 is shown in Table B1, and the aberration is shown in FIG. 8.

Embodiment B2

Figures 9A, 9B:
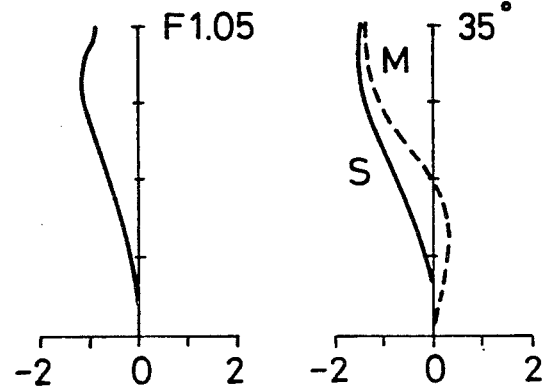
FIGS. 9a and 9b show the aberration of the fourth embodiment, B2, of the invention.

The dimensions, coefficients and other numerical factors of Embodiment B2 is shown in Table B2, and the aberration is shown in FIG. 9.

Embodiment B3

Figures 10A, 10B:
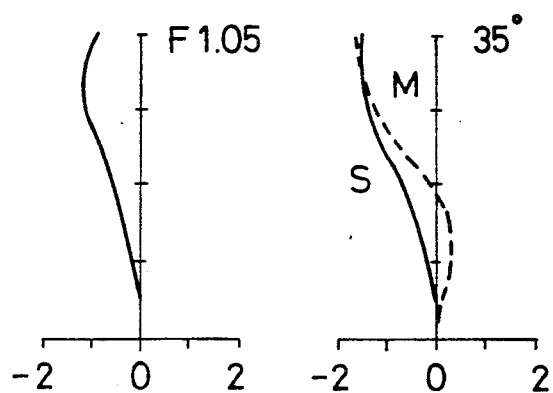
FIGS. 10a and 10b show the aberration of the fifth embodiment, B3, of the invention.

The dimensions, coefficients and other numerical factors of Embodiment B3 is shown in Table B3, and the aberration is shown in FIG. 10.

Embodiment B4

Figures 11A, 11B:
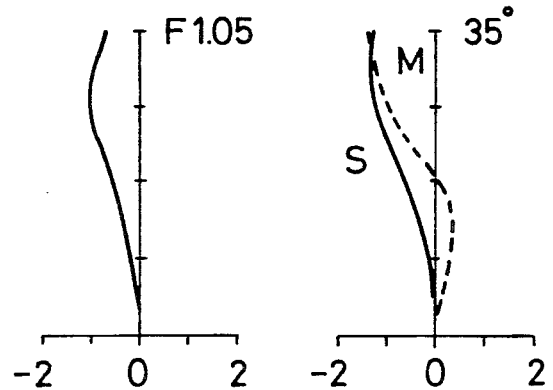
FIGS. 11a and 11b show the aberration of the sixth embodiment, B4, of the invention.

The dimensions, coefficients and other numerical factors Embodiment B4 is shown in Table B4, and the aberration is shown in FIG. 11.

The projection lens according to the second aspect of the invention has a nominal focal ratio as large as 1.05 and the field angle as large as 35 degrees, and yet it has a good image forming performance. It employs a plastic aspheric lens which is easy to fabricate, so it contributes to increase of productivity. It also enables realization of a compact and thin projection television.

TABLE A1

| | $f = 83.8785$ Fno $= 1.07$ m $= -0.106$ w $= 35°$ | | | | | | | | |
|---|---|---|---|---|---|---|---|---|---|
| L1 | r1 | 226.677 | d1 | 6.682 | n1 | 1.591617 | $\nu 1$ | 61.3 |
| | r2 | 2045.943 | d2 | 0.249 | n2 | 1 | $\nu 2$ | |
| L2 | r3 | 84.498 | d3 | 6.724 | n3 | 1.494250 | $\nu 3$ | 56.9 |
| | r4 | 153.369 | d4 | 14.584 | n4 | 1 | $\nu 4$ | |
| L3 | r5 | 334.907 | d5 | 3.842 | n5 | 1.624421 | $\nu 5$ | 36.3 |
| | r6 | 110.254 | d6 | 8.205 | n6 | 1 | $\nu 6$ | |
| L4 | r7 | 80.508 | d7 | 27.774 | n7 | 1.591617 | $\nu 7$ | 61.3 |
| | r8 | −111.775 | d8 | 17.664 | n8 | 1 | $\nu 8$ | |
| L5 | r9 | −144.905 | d9 | 6.500 | n9 | 1.494250 | $\nu 9$ | 56.9 |
| | r10 | −73.094 | d10 | 26.889 | n10 | 1 | $\nu 10$ | |
| L6 | r11 | −41.819 | d11 | 4.500 | n11 | 1.624421 | $\nu 11$ | 36.3 |
| COOLING LIQUID | r12 | −45.513 | d12 | 7.100 | n12 | 1.401958 | | |

TABLE A1-continued

| | | f = 83.8785 Fno = 1.07 m = −0.106 w = 35° | | | | | | |
|---|---|---|---|---|---|---|---|---|
| FACEPLATE | r13 | inf | d13 | 14.100 | n13 1.539800 | | | |
| FLUORESCENT SURFACE | r14 | −350.000 | | | | | | |

| | r3 | r4 | r9 | r10 |
|---|---|---|---|---|
| CC | −0.90945 | −2.16010 | 6.19867 | −2.62756 |
| A4 | −.304102E-06 | .154008E-06 | −.306449E-07 | .212633E-08 |
| A6 | −.317832E-09 | −.591317E-10 | .497526E-09 | .110451E-09 |
| A8 | .273442E-12 | .248330E-12 | .187036E-12 | .343109E-12 |
| A10 | −.670550E-16 | −.186228E-16 | .146377E-15 | .171775E-15 |

TABLE A2

| | | f = 84.0735 Fno = 1.12 m = −0.106 w = 35° | | | | | | |
|---|---|---|---|---|---|---|---|---|
| L1 | r1 | 88.613 | d1 | 9.330 | n1 1.591617 | $\nu$1 | 61.3 |
| | r2 | 219.104 | d2 | 3.318 | n2 1 | $\nu$2 | |
| L2 | r3 | 100.907 | d3 | 6.724 | n3 1.494250 | $\nu$3 | 56.9 |
| | r4 | 175.930 | d4 | 10.086 | n4 1 | $\nu$4 | |
| L3 | r5 | 323.343 | d5 | 3.824 | n5 1.624421 | $\nu$5 | 36.3 |
| | r6 | 87.142 | d6 | 8.941 | n6 1 | $\nu$6 | |
| L4 | r7 | 79.708 | d7 | 23.436 | n7 1.591617 | $\nu$7 | 61.3 |
| | r8 | −102.167 | d8 | 21.583 | n8 1 | $\nu$8 | |
| L5 | r9 | −126.946 | d9 | 6.760 | n9 1.494250 | $\nu$9 | 56.9 |
| | r10 | −66.939 | d10 | 22.366 | n10 1 | $\nu$10 | |
| L6 | r11 | −40.950 | d11 | 4.500 | n11 1.624428 | $\nu$11 | 36.3 |
| COOLING LIQUID | r12 | −44.812 | d12 | 6.900 | n12 1.401958 | | |
| FACEPLATE | r13 | inf | d13 | 14.100 | n13 1.539800 | | |
| FLUORESCENT SURFACE | r14 | −350.000 | | | | | |

| | r3 | r4 | r9 | r10 |
|---|---|---|---|---|
| CC | −.953394 | 8.901923 | −.858181 | −.800814 |
| A4 | −.382026E-06 | .104536E-06 | −.831660E-06 | .207232E-06 |
| A6 | −.148962E-09 | .261994E-10 | .686964E-09 | −.367751E-09 |
| A8 | .755790E-13 | .105877E-12 | −.108258E-11 | −.145231E-12 |
| A10 | −.577405E-16 | −.511341E-16 | .306723E-15 | −.891240E-18 |

TABLE B1

| HALF FIELD ANGLE 35° APERTURE RATIO 1:1.05 | | | | |
|---|---|---|---|---|
| | R | D | N | $\nu$ |
| OBJECT | INF | 714.64 | | |
| s1 | 164.55400 | 6.21 | 1.58913 | 61.0 |
| s2 | 355.25900 | 0.29 | | |
| s3 | 77.35043 | 6.63 | 1.49197 | 55.5 |
| s4 | 137.85712 | 15.00 | | |
| s5 | 200.77800 | 3.64 | 1.62004 | 36.0 |
| s6 | 93.86200 | 6.30 | | |
| s7 | 76.08000 | 14.00 | 1.58913 | 61.0 |
| s8 | −642.91000 | 3.35 | | |
| s9 | −1576.00000 | 10.07 | 1.51680 | 64.3 |
| s10 | −105.75300 | 15.27 | | |
| s11 | −111.94447 | 6.53 | 1.49197 | 55.5 |
| s12 | −67.33752 | 27.42 | | |
| s13 | −40.67640 | 4.50 | 1.62004 | 36.0 |
| s14 | −45.00000 | 7.10 | 1.42500 | 73.2 |
| s15 | INF | 14.10 | 1.53738 | 56.6 |
| IMAGE | −350.00000 | 0.00 | | |

| | ASPHERICAL COEFFICIENTS | | | |
|---|---|---|---|---|
| | S3 | S4 | S11 | S12 |
| CC | −0.559922 | 0.628784 | 5.125409 | −2.940980 |
| A4 | −0.223052E-06 | 0.271760E-06 | 0.173316E-06 | −0.135126E-06 |
| A6 | −0.278479E-09 | −0.681491E-10 | 0.891542E-09 | 0.143807E-09 |
| A8 | 0.241274E-12 | 0.263547E-12 | 0.262521E-12 | 0.721082E-12 |
| A10 | −0.739140E-16 | −0.351497E-16 | 0.668171E-16 | −0.223070E-16 |

TABLE B2

| HALF FIELD ANGLE 35° APERTURE RATIO 1:1.05 | | | | |
|---|---|---|---|---|
| | R | D | N | $\nu$ |
| OBJECT | INF | 801.50 | | |
| s1 | 171.15000 | 6.42 | 1.58913 | 61.0 |
| s2 | 343.20900 | 0.30 | | |

TABLE B2-continued

HALF FIELD ANGLE 35° APERTURE RATIO 1:1.05

| | | | | |
|---|---:|---:|---:|---:|
| s3 | 77.35043 | 6.63 | 1.49197 | 55.5 |
| s4 | 137.85712 | 15.26 | | |
| s5 | 205.77900 | 3.77 | 1.62004 | 36.0 |
| s6 | 96.47100 | 5.91 | | |
| s7 | 75.82000 | 13.85 | 1.58913 | 61.0 |
| s8 | −1046.06000 | 3.43 | | |
| s9 | 11700.10000 | 9.77 | 1.51680 | 64.3 |
| s10 | −107.24000 | 15.23 | | |
| s11 | −111.94447 | 6.53 | 1.49197 | 55.5 |
| s12 | −67.33752 | 27.42 | | |
| s13 | −40.67640 | 4.50 | 1.62004 | 36.0 |
| s14 | −45.00000 | 7.10 | 1.42500 | 73.2 |
| s15 | INF | 14.10 | 1.53738 | 56.6 |
| IMAGE | −350.00000 | 0.00 | | |

ASPHERICAL COEFFICIENTS

| | S3 | S4 | S11 | S12 |
|---|---|---|---|---|
| CC | −0.559922 | 0.628784 | 5.125409 | −2.940980 |
| A4 | −0.223052E-06 | 0.271760E-06 | 0.173316E-06 | −0.135126E-06 |
| A6 | −0.278479E-09 | −0.681491E-10 | 0.891542E-09 | 0.143807E-09 |
| A8 | 0.241274E-12 | 0.263547E-12 | 0.262521E-12 | 0.721082E-12 |
| A10 | −0.739140E-16 | −0.351497E-16 | 0.668171E-16 | −0.223070E-16 |

TABLE B3

HALF FIELD ANGLE 35° APERTURE RATIO 1:1.05

| | R | D | N | $\nu$ |
|---|---:|---:|---:|---:|
| OBJECT | INF | 882.13 | | |
| s1 | 160.87000 | 6.61 | 1.58913 | 61.0 |
| s2 | 277.11000 | 0.22 | | |
| s3 | 77.35043 | 6.63 | 1.49197 | 55.5 |
| s4 | 137.85712 | 14.53 | | |
| s5 | 200.00000 | 3.80 | 1.62004 | 36.0 |
| s6 | 96.75900 | 5.86 | | |
| s7 | 75.43700 | 13.19 | 1.58913 | 61.0 |
| s8 | −4300.00000 | 3.89 | | |
| s9 | 1171.31270 | 10.24 | 1.51680 | 64.3 |
| s10 | −107.93000 | 15.13 | | |
| s11 | −111.94447 | 6.53 | 1.49197 | 55.5 |
| s12 | −67.33752 | 27.42 | | |
| s13 | −40.67640 | 4.50 | 1.62004 | 36.0 |
| s14 | −45.00000 | 7.10 | 1.42500 | 73.2 |
| s15 | INF | 14.10 | 1.53738 | 56.6 |
| IMAGE | −350.00000 | 0.00 | | |

ASPHERICAL COEFFICIENTS

| | S3 | S4 | S11 | S12 |
|---|---|---|---|---|
| CC | −0.559922 | 0.628784 | 5.125409 | −2.940980 |
| A4 | −0.223052E-06 | 0.271760E-06 | 0.173316E-06 | −0.135126E-06 |
| A6 | −0.278479E-09 | −0.681491E-10 | 0.891542E-09 | 0.143807E-09 |
| A8 | 0.241274E-12 | 0.263547E-12 | 0.262521E-12 | 0.721082E-12 |
| A10 | −0.739140E-16 | −0.351497E-16 | 0.668171E-16 | −0.223070E-16 |

TABLE B4

HALF FIELD ANGLE 35° APERTURE RATIO 1:1.05

| | R | D | N | $\nu$ |
|---|---:|---:|---:|---:|
| OBJECT | INF | 1046.94 | | |
| s1 | 160.00000 | 6.61 | 1.58913 | 61.0 |
| s2 | 247.64160 | 0.22 | | |
| s3 | 77.35043 | 6.63 | 1.49197 | 55.5 |
| s4 | 137.85712 | 15.20 | | |
| s5 | 200.00000 | 3.80 | 1.62004 | 36.0 |
| s6 | 98.23767 | 5.27 | | |
| s7 | 75.00398 | 13.86 | 1.58913 | 61.0 |
| s8 | −2262.53860 | 3.50 | | |
| s9 | 1636.06476 | 9.90 | 1.51680 | 64.3 |
| s10 | −109.13813 | 15.25 | | |
| s11 | −111.94447 | 6.53 | 1.49197 | 55.5 |
| s12 | −67.33752 | 27.18 | | |
| s13 | −40.67640 | 4.50 | 1.62004 | 36.0 |
| s14 | −44.71298 | 7.10 | 1.42500 | 73.2 |
| s15 | INF | 14.10 | 1.53738 | 56.6 |
| IMAGE | −350.00000 | 0.00 | | |

ASPHERICAL COEFFICIENTS

TABLE B4-continued

| HALF FIELD ANGLE 35° APERTURE RATIO 1:1.05 | | | |
|---|---|---|---|
| | S3 | S4 | S11 | S12 |
| CC | −0.559922 | 0.628784 | 5.125409 | −2.940980 |
| A4 | −0.223052E-06 | 0.271760E-06 | 0.173316E-06 | −0.135126E-06 |
| A6 | −0.278479E-09 | −0.681491E-10 | 0.891542E-09 | 0.143807E-09 |
| A8 | 0.241274E-12 | 0.263547E-12 | 0.262521E-12 | 0.721082E-12 |
| A10 | −0.739140E-16 | −0.351497E-16 | 0.668171E-16 | −0.223070E-16 |

What is claimed is:

1. A projection lens system for projecting an enlargement, on a display screen, of an image appearing on a faceplate of a cathode ray tube, comprising six lens groups, the first group from an end closest to the display being in the form of a positive meniscus, the second group being positive and convex to the display screen, the third group being negative, the fourth group being bi-convex, the fifth group being positive, and the sixth group having a negative power of refraction surface, each of the second and fifth groups including a plastic lens element having at least one aspheric surface, wherein the following conditions are satisfied:

$$0.15 < f/f_1 < 0.35$$

$$-0.45 < f/f_3 < -0.30$$

$$1.00 < f/f_4 < 1.15$$

$$-0.90 < f/f_6 < -0.85$$

where
   f represents a focal length of the overall projection lens system,
   $f_1$ represents a focal length of the first group,
   $f_3$ represents a focal length of the third group,
   $f_4$ represents a focal length of the fourth group, and
   $f_6$ represents a focal length of the sixth group.

2. The projection lens of claim 1, wherein the first group includes a lens element which has a positive power of refraction surface, and which has a function of correcting spherical aberration and coma.

3. The projection lens of claim 1, wherein the second group includes a weak positive lens element which is in a form of a meniscus, has a small amount of power, and precisely corrects spherical aberration throughout the aperture.

4. The projection lens of claim 1, wherein the third group includes a lens element which has a weak negative power of refraction surface, and has a function of correcting coma and spherical aberration.

5. The projection lens of claim 1, wherein the fourth group includes a lens element which has a strong convergence function.

6. The projection lens of claim 1, wherein the fifth group includes a lens element which has a small amount of power and precisely corrects astigmatism and distortion.

7. The projection lens of claim 6, wherein the lens element of the fifth group is disposed at a position where marginal ray height from the optical axis is small, so as to give only a little effect to spherical aberration, and can effectively correct off-axis aberration up to a periphery of the display screen.

8. The projection lens of claim 1, wherein the faceplate of the cathode ray tube has a spherical fluorescent surface, and the sixth group includes a lens element which has a strong concave surface to the display screen.

9. The projection lens of claim 8, wherein the lens element of the sixth group serves, together with a cooling liquid on a surface of the faceplate of the cathode ray tube, as a negative lens, and corrects field curvature.

10. The projection lens of claim 1, wherein each of the lens elements of the second and the fifth groups has aspheric surfaces on both sides.

11. The projection lens of claim 1, wherein the lens element of the second group fails to have an inflection point on either surface.

12. The projection lens of claim 1, wherein the fourth group includes a first lens element which is a bi-convex positive lens element and a second lens element disposed close to said first lens element.

13. The projection lens of claim 12, wherein the lens element of the fifth group has a surface concave to the display screen.

14. The projection lens of claim 12, wherein the lens element of the sixth group has a strong concave surface to the display screen.

15. The projection lens of claim 1, with the parameters as set forth in the Table A1.

16. The projection lens of claim 1, with the parameters as set forth in the Table A2.

17. A projection lens system for projecting an enlargement, on a display screen, of an image appearing on a faceplate of a cathode ray tube, comprising six lens groups, the first group from an end closest to the display screen, being in the form of a positive meniscus, the second group being positive and convex to the display screen, the third group being negative, the fourth group including a first lens element which is a bi-convex positive lens element and a second lens element disposed proximate to the first lens element, the fifth group being positive, and the sixth group having a negative power of refraction surface, each of the second and fifth groups including a plastic lens element having at least one aspheric surface, wherein the following conditions are satisfied:

$$0.0 < f/f_1 < 0.3$$

$$-0.4 < f/f_3 < -0.1$$

$$0.2 < f/f_{4b} < 0.6$$

where
   f represents a focal length of the overall projections lens system,
   $f_1$ represents a focal length of the first group,
   $f_3$ represents a focal length of the third group, and
   $f_{4b}$ represents a focal length of the second lens element of the fourth group.

18. The projection lens of claim 17, wherein the first group includes a lens element which has a positive power of refraction surface, and which has a function of correcting the spherical aberration and coma.

19. The projection lens of claim 17, wherein the second group includes a weak positive lens element which is in a form of a meniscus, has a small amount of power, and precisely corrects spherical aberration throughout the aperture.

20. The projection lens of claim 17, wherein the third group includes a lens element which has a weak negative power of refraction surface, and has a function of correcting coma and spherical aberration.

21. The projection lens of claim 17, wherein the fourth group includes a lens element which has a strong convergence function.

22. The projection lens of claim 17, wherein the fifth group includes a lens element which has a small amount of power and precisely corrects astigmatism and distortion.

23. The projection lens of claim 22, wherein the lens element of the fifth group is disposed at a position where marginal ray height from the optical axis is small, so as to give only a little effect to spherical aberration, and can effectively correct off-axis aberration up to a periphery of the display screen.

24. The projection lens of claim 17, wherein the faceplate of the cathode ray tube has a spherical fluorescent surface, and the sixth group includes a lens element which has a strong concave surface to the display screen.

25. The projection lens of claim 24, wherein the lens element of the sixth group serves, together with a cooling liquid on a surface of the faceplate of the cathode ray tube, as a negative lens, and corrects field curvature.

26. The projection lens of claim 17, wherein each of the lens elements of the second and the fifth groups has aspheric surfaces on both sides.

27. The projection lens of claim 17, wherein the lens element of the second group fails to have an inflection point on either surface.

28. The projection lens of claim 17, wherein the lens element of the fifth group has a surface concave to the display screen.

29. The projection lens of claim 17, wherein the lens element of the sixth group has a strong concave surface to the display screen.

30. The projection lens of claim 17, with the parameters as set forth in the Table B1.

31. The projection lens of claim 17, with the parameters as set forth in the Table B2.

32. The projection lens of claim 17, with the parameters as set forth in the Table B3.

33. The projection lens of claim 17, with the parameters as set forth in the Table B4.

* * * * *